United States Patent [19]
Newman et al.

[11] Patent Number: 4,975,296
[45] Date of Patent: Dec. 4, 1990

[54] METHOD FOR PREPARING BEVERAGES

[75] Inventors: Alec T. Newman; Andrew C. Bentley; Christine A. King, all of Banbury; Alistair J. MacMahon, Northants; Robert W. Tansley; Andrew R. Gibbs, both of Warwickshire, all of United Kingdom

[73] Assignee: General Foods Limited, Banbury, England

[21] Appl. No.: 450,357

[22] Filed: Dec. 13, 1989

Related U.S. Application Data

[62] Division of Ser. No. 324,080, Mar. 15, 1989, Pat. No. 4,920,870.

[30] Foreign Application Priority Data

Mar. 21, 1988 [GB] United Kingdom ................. 8806668

[51] Int. Cl.5 ........................... A23F 3/00; A23F 5/00
[52] U.S. Cl. ..................................... 426/433; 426/77; 426/435
[58] Field of Search .................. 426/433, 435, 77, 82; 99/289 R, 302 R

[56] References Cited

U.S. PATENT DOCUMENTS 3,420,675 1/1969 Costas .................................... 426/77
4,853,234 8/1989 Bentley et al. ....................... 426/433

FOREIGN PATENT DOCUMENTS 730867 3/1966 Canada ............................... 426/433

Primary Examiner—George Yeung
Attorney, Agent, or Firm—Linn I. Grim

[57] ABSTRACT

A beverage is prepared employing a package (10) having a compartment (111) containing at least one beverage ingredient, e.g. roast and ground coffee. The package is located at a brewing station, an aqueous medium, e.g. hot water, is introduced into the package, the aqueous medium is allowed to commingle with the beverage ingredient, and the beverage so formed is collected through an outlet (38) formed in the package. The compartment of the package is sealed by a covering material (119) which determines one dimension of at least one opening (115) acting to filter the beverage passing out of the compartment to the outlet of the package. The package is also clamped at the brewing station prior to the introduction of the aqueous medium in a manner which maintains said one dimension during the subsequent formation and collection of the beverage.

8 Claims, 17 Drawing Sheets

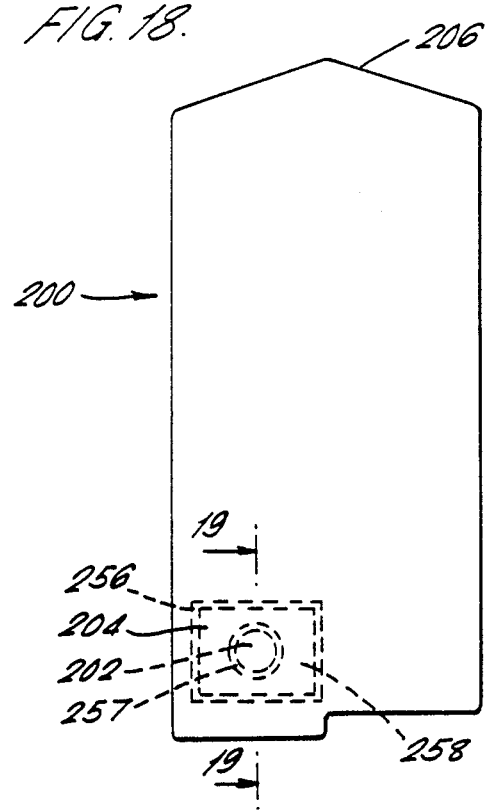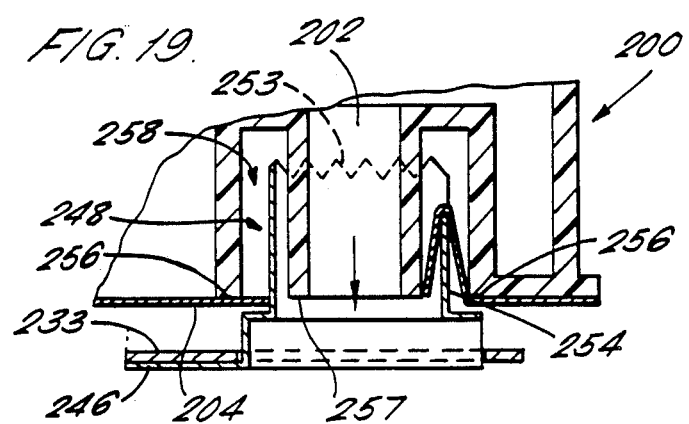

METHOD FOR PREPARING BEVERAGES

This is a division, of application Ser. No. 324,080, filed 3/15/89, now U.S. Pat. No. 4,920,870.

This invention relates to beverage preparing machines and, in particular, machines for preparing beverages from beverage containing packages.

In our European Patent application No. 87311325.2 there is described a package which contains at least one beverage ingredient, e.g. coffee. In a preferred embodiment the package is formed from a substantially air-and water-impermeable material and comprises a sealed body portion having a compartment containing the beverage ingredient and outlet means designed so that the beverage produced, in use, is filtered thereby avoiding the necessity for an external filter.

There is also described in application Ser. No. 87311325.2, a method for preparing a beverage which comprises positioning a beverage containing package at a brewing station, introducing water through water introduction means into the package, allowing the water to commingle with the beverage ingredient, and collecting the beverage so-formed through an outlet formed in the package.

According to the invention there is provided a method of preparing a beverage employing a package having a compartment containing at least one beverage ingredient, comprising locating the package at a brewing station, introducing an aqueous medium into the package, allowing the aqueous medium to commingle with the beverage ingredient in the compartment, and collecting the beverage so formed through an outlet formed in the package, wherein the compartment of the package is sealed by a covering material which determines one dimension of at least one opening acting to filter the beverage passing out of the compartment to the outlet of the package, and wherein the package is clamped at the brewing station prior to the introduction of the aqueous medium in a manner which maintains said one dimension during the subsequent formation and collection of the beverage.

Preferably the package is a flat pack which is clamped between top and bottom platens at the brewing station, the surface of the package which, in use, is the uppermost surface being formed by the covering material sealing the compartment of the package, the whole of the covering material being held in surface to surface contact with the top platen whilst the package is clamped between the platens.

It is also preferred that a series of slots for filtering the beverage are defined by castellations to which the covering material for the compartment is spot sealed, the covering material determining the width of each slot.

The method preferably includes the step of engaging the package at a point of entry of the package into the machine, and conveying the package to the brewing station.

The method preferably includes the further step of forming an outlet opening in the package or opening a sealed outlet in the package, the formed beverage emerging through said outlet.

Preferably hot water is the aqueous medium which is passed through the package. It is also preferred that the passage of the aqueous medium is followed by a burst of compressed air through the package.

The method preferably also includes the step of ejecting the used package from the brewing station, for example, into a waste bin within the beverage preparing machine.

The method may include the further preliminary step of the user selecting the package from a storage portion of the beverage preparing machine.

The invention also provides a machine for preparing a beverage by employing a package having a compartment containing at least one beverage ingredient, comprising means for locating the package at a brewing station, and means for introducing an aqueous medium into the package to enable the aqueous medium to commingle with the beverage ingredient in the compartment to form a beverage, the beverage so formed being collected through an outlet formed in the package, wherein the compartment of the package is sealed by a covering material which determines one dimension of at least one opening acting to filter the beverage passing out of the compartment to the outlet of the package, and wherein means are provided for clamping the package at the brewing station prior to the introduction of the aqueous medium, which clamping means maintains said one dimension during the subsequent formation and collection of the beverage.

Preferably the package is a flat pack and the clamping means comprise top and bottom platens at the brewing station, the top platen making surface to surface contact with the surface of the package which, in use, is the uppermost surface and which is formed by the covering material sealing the compartment of the package.

The machine preferably includes means for engaging the package at a point of entry of the package into the machine, and conveying the package to the brewing station.

It is preferred that the machine further includes means for the formation of an outlet opening in the package or for opening a sealed outlet in the package, to allow the formed beverage to emerge therethrough.

Preferably there is provided a supply of hot water as the aqueous medium, and means for feeding hot water from the supply to means for introducing water into the package.

Means are also preferably provided for passing compressed air through the package, which means are preferably connected to the means for introducing the aqueous medium.

It is preferred that means are provided for ejecting the used package from the brewing station, and preferably a waste bin is provided for collecting the used packages.

Preferably there are provided means for storing a plurality of packages, and means for the user to select a required package from the storage means.

By way of example, specific embodiments of a beverage machine in accordance with the invention will be described with reference to the accompanying drawings in which:

FIG. 18 is an underneath view of a package to be treated in the machine of FIG. 17; and FIG. 19 is a section along line 19—19 in FIG. 18, illustrating the cutting and folding action of the piercing tool.

The embodiments of this example are concerned generally with a kind of beverage preparing machine in which the user inserts a package containing at least one beverage ingredient into the machine and the machine dispenses the required beverage. In the particular embodiment described, the beverage is coffee, e.g. roast and ground coffee, but it is envisaged that, in each embodiment, the machine is equally applicable for dispensing other beverages from appropriate beverage packages, e.g. tea, chocolate or soup. Moreover, with the addition of an alternative cold water supply, the machine could readily be adapted to dispense cold drinks on insertion of a suitable package.

Figure 1:
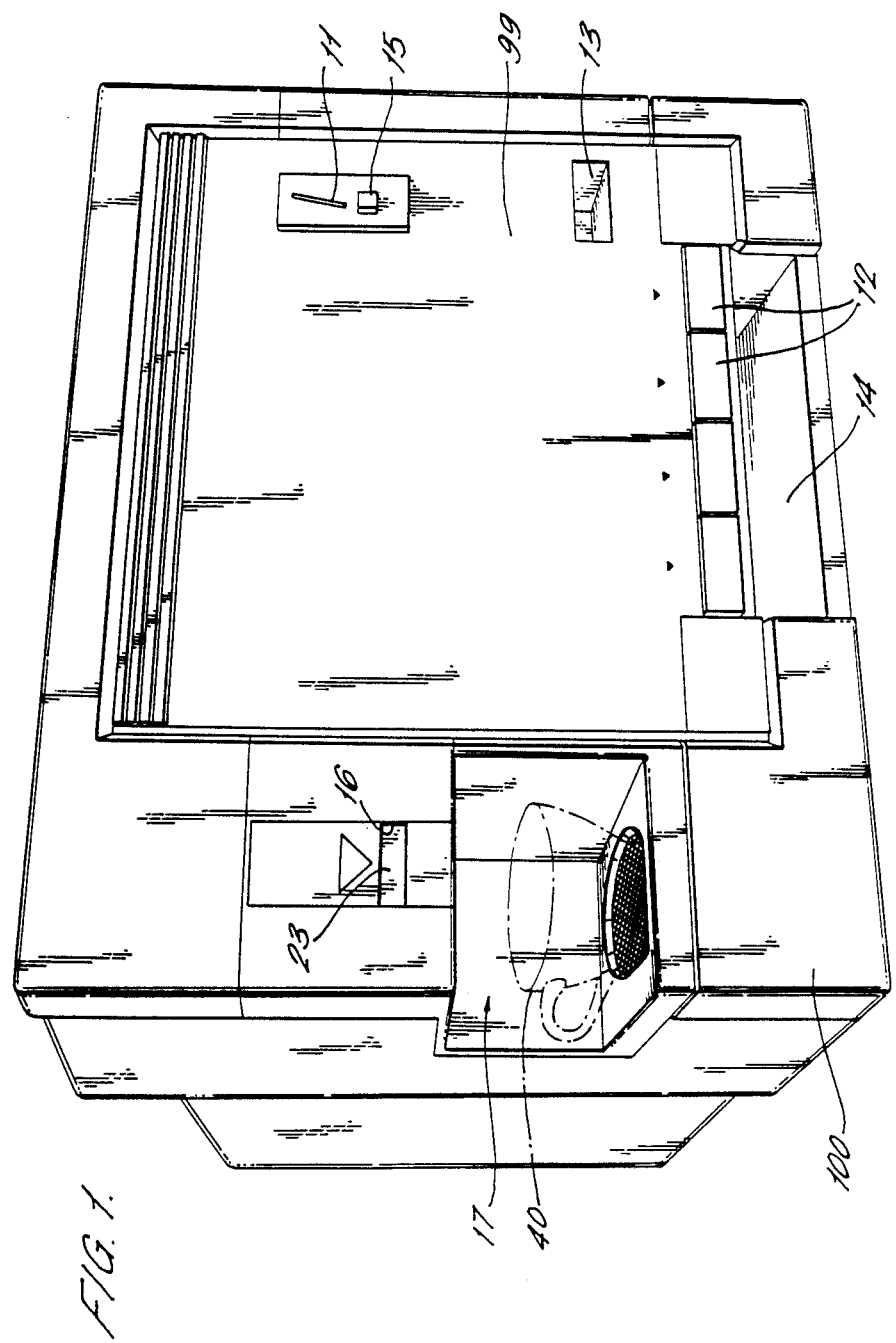
FIG. 1 is a perspective view of a first beverage preparing machine.
Figure 2:
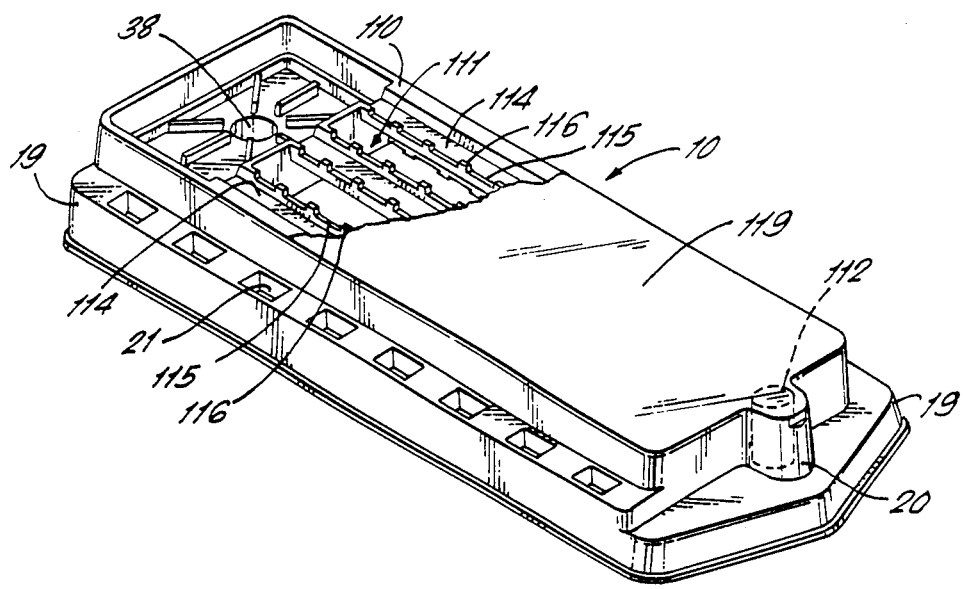
FIG. 2 shows a package for use in the machine of FIG. 1, the package being part cut-away and illustrating the surface of the package which, in use, is the uppermost surface.
Figure 3:
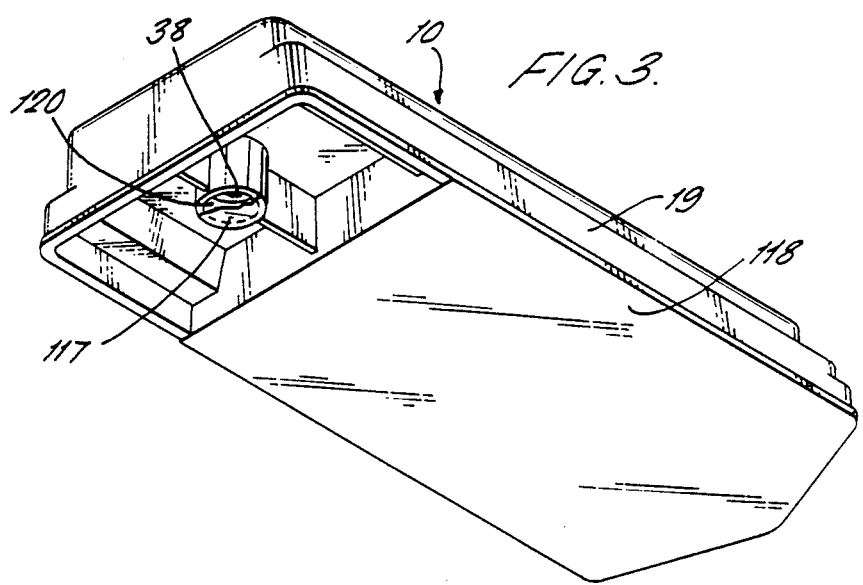
FIG. 3 shows the underside of the package of FIG. 2.
Figure 4:
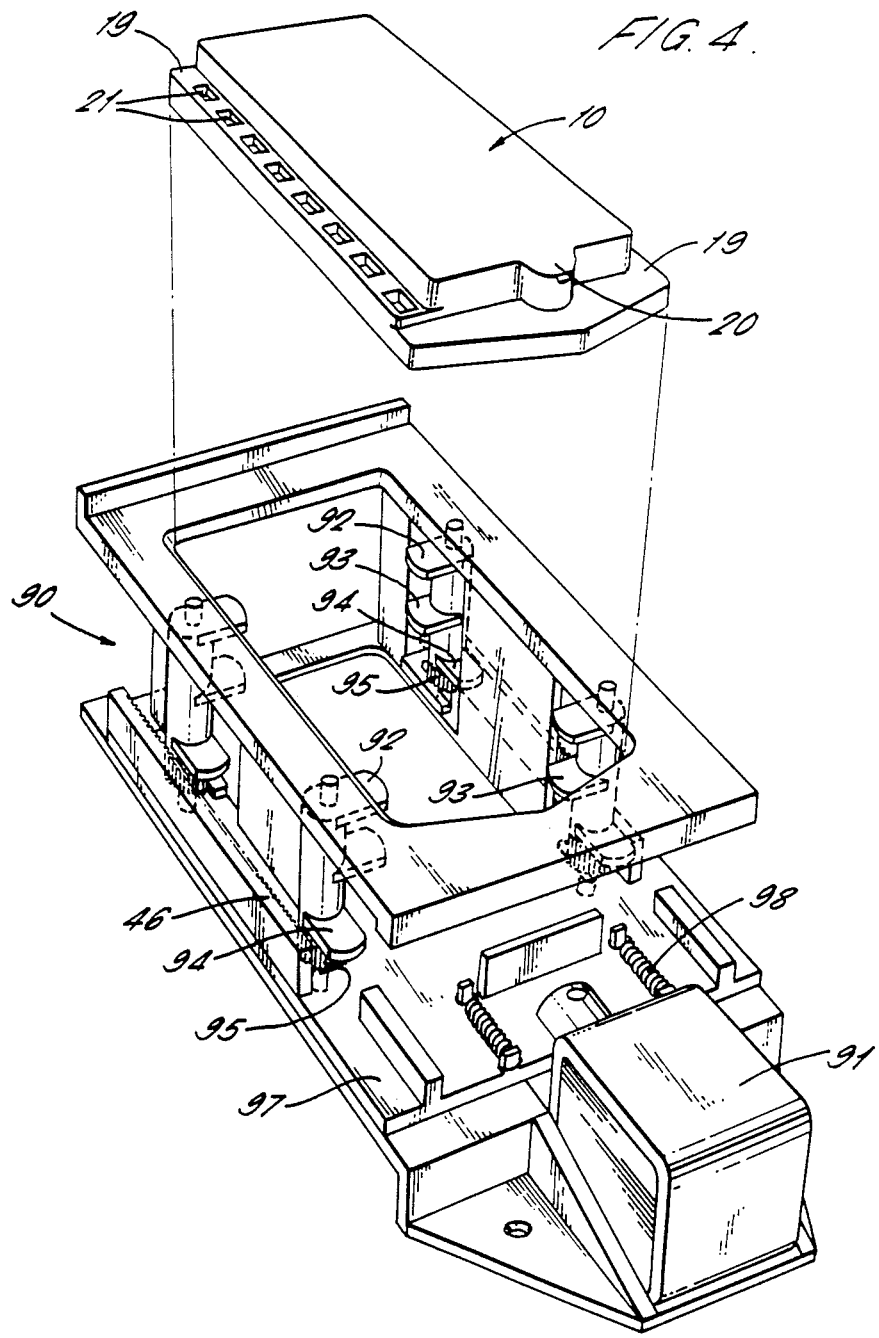
FIG. 4 is a perspective view of one of the four stacks of packages stored in the machine of FIG. 1, viewed from the rear.
Figure 5:
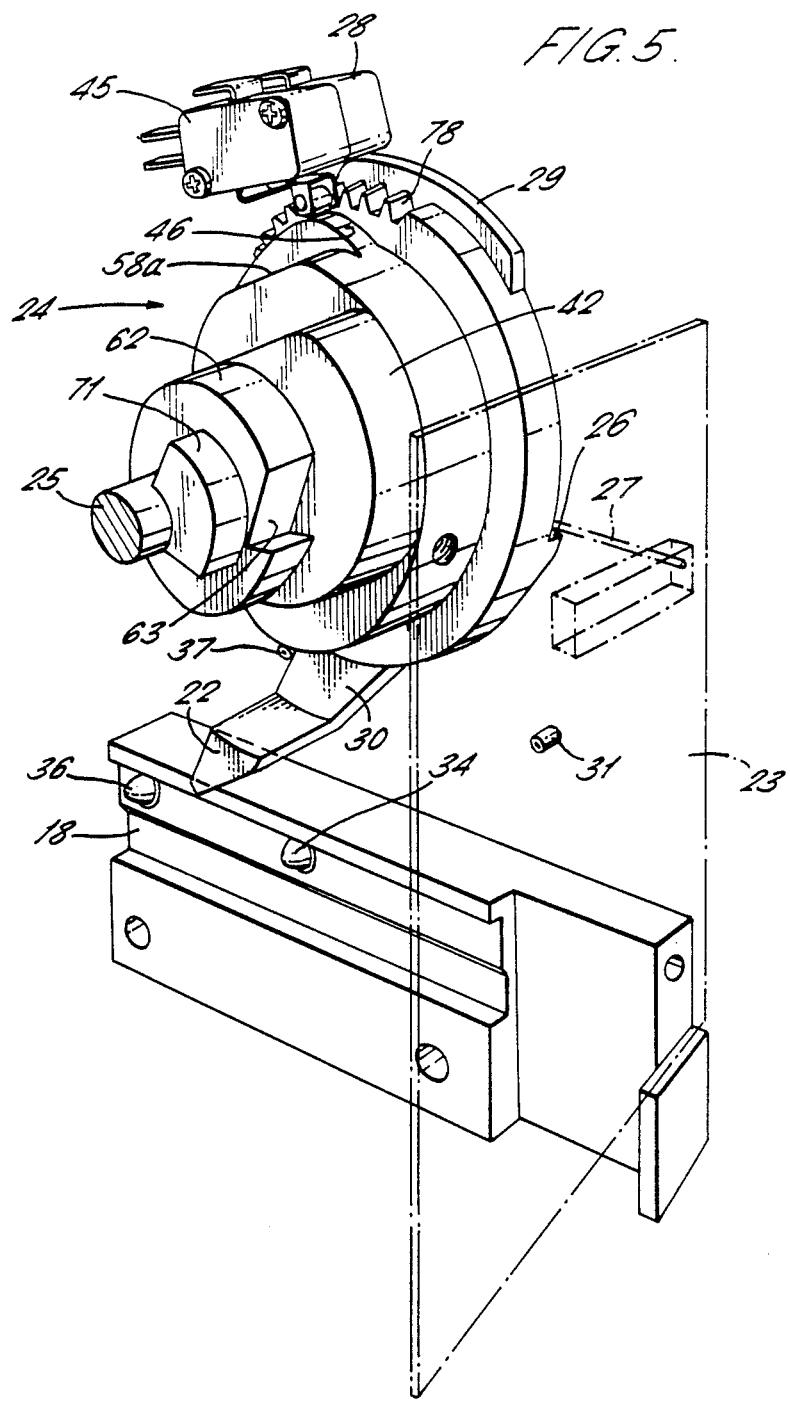
FIG. 5 illustrates the cam mechanism prior to selection of a package, the slot door being closed.
Figure 6:
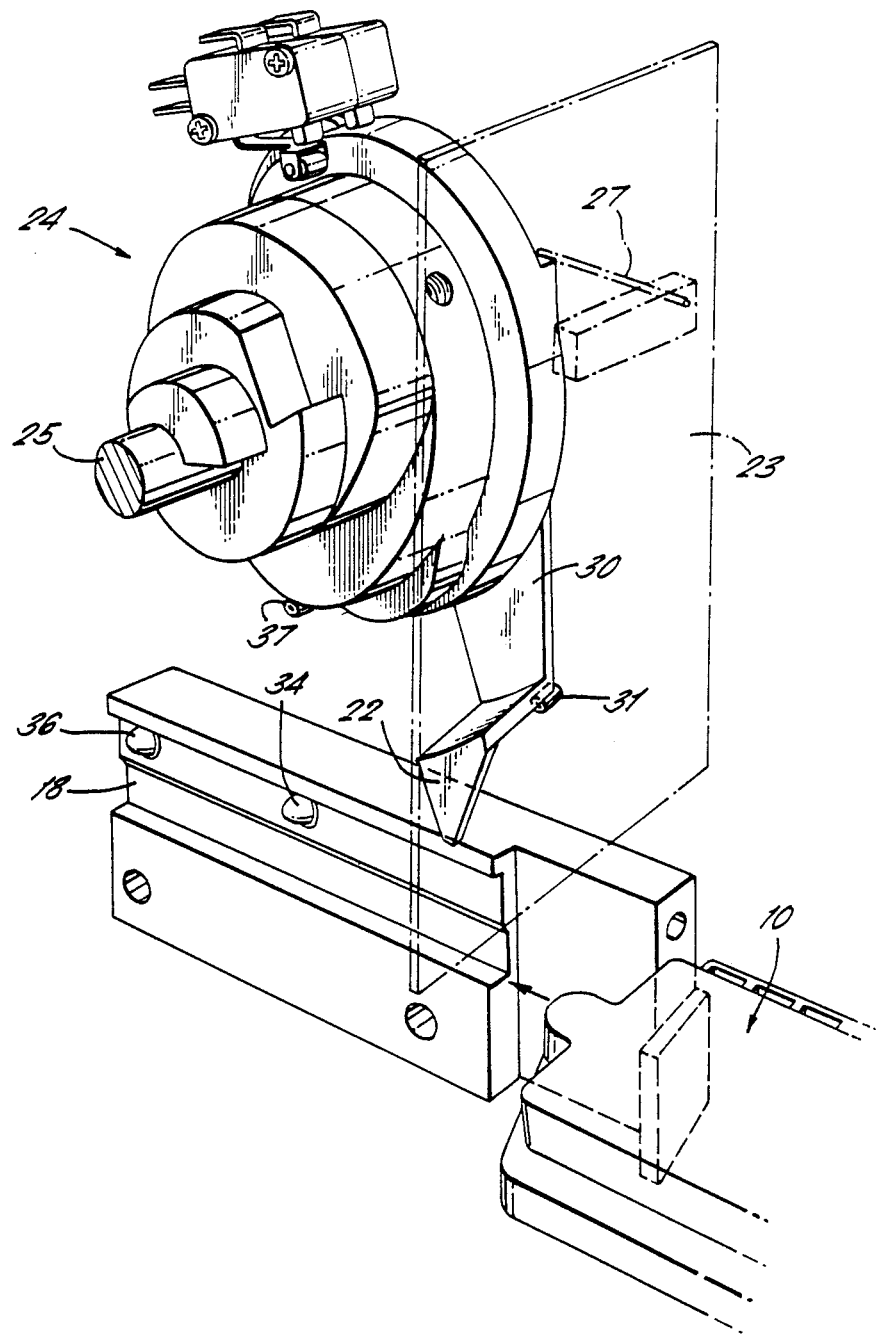
FIG. 6 is a similar view to FIG. 5, the cam having been rotated backwards to open the slot door to allow the package to be manually inserted into the slot.

For the embodiment illustrated in FIGS. 1 to 16, the preferred package is described in detail in FIGS. 4 to 6 of the specification of our co-pending European Pat. application Ser. No. 87311325.2. However, the package (FIGS. 2 and 3 of the present application) has a generally rectangular shape with flat top and bottom surfaces and is thereby suitable for insertion into the machine longitudinally through a slot. The package 10 has a body portion 110 formed from a rigid plastics material, e.g. polypropylene, which provides the walls of a compartment 111 for containing the desired beverage ingredient which, in this embodiment, is roast and ground coffee. The base of the compartment is provided by a bottom sealing layer 118 (FIG. 3) of a flexible material, in this embodiment aluminium foil. The body portion 110 also provides a water inlet 112 at the leading end of the package which is open to the top of the package and which communicates internally of the package with the bottom of the compartment 111. Similarly, a coffee outlet aperture 38, open to the bottom of the package at the other end, communicates internally of the package with the top of the compartment 111 via channels 114 and slots 115 between the channels and the compartment. The slots 115 are defined by castellations 116 in the walls of the body portion 110 dividing the channels 114 from the compartment 111. The whole of the top surface of the body portion 110 is covered by a sealing layer 119 (FIG. 2) of aluminium foil which is continuously edge sealed around the periphery of the body portion to prevent the ingress of air, and also spot sealed to the castellations 116 between the slots 115. The layer 119 of foil thus provides the top surface of each slot 115. Initially, the outlet aperture 38 is also separately sealed with aluminium foil 117 (FIG. 3). The coffee thereby remains fresh within the package during storage. In use, the inlet 112 and the outlet 38 are opened and sufficient water is passed through the package under pressure. The water is force fed downwardly through the inlet 112 into the bottom of the compartment 111, disperses upwardly through the coffee grounds, and filtered coffee is dispensed from the top of the compartment through the slots 115 into the channels 114 and via the outlet aperture 38 into a cup 40 placed beneath the outlet.

Referring further to FIGS. 1 to 16, a coffee dispensing machine has capacity to store four stacks of packages 10 side by side behind a hinged front panel 99. In this embodiment, the machine is coin-operated so that by inserting a coin through a slot 11, and pressing the button 12 of a particular stack, a releasing mechanism associated with the stack causes the bottom package of the stack to drop into the tray 14 for removal by the user. Should a package not be provided, for some reason, the coin may be retrieved from a recess 13 by pressing the button 15.

Alternatively, the coin-operated mechanism may be omitted or bypassed, whereby the required package is made available by pressing the appropriate button 12.

The releasing mechanism (FIG. 4) for each stack comprises an arrangement of fingers 90 mounted for reciprocal, rotary movement in a horizontal plane by an electric motor 91. Sets of fingers 90 are disposed on opposite sides of the column of packages, each set comprising three fingers 92, 93, 94 spaced apart one above the other. The fingers of each set are arranged in fixed relation, the top and middle fingers 92,93 being aligned vertically, but the bottom finger 94 being displaced at 90° to the top and middle fingers. Each set of fingers is rotated by a rack 95 and pinion 96, the racks 95 being part of or attached to a bottom sliding plate 97 which is moved in one direction by actuation of the motor 91 and returned by springs 98.

Initially the lowermost package, when it is first loaded into the machine, rests on the top four fingers 92 which are directed inwardly, i.e. transversely, of the package as shown. Actuation of the motor 91 by pressing the button 12, slides the plate 97 rearwardly thereby rotating the sets of fingers through 90°, clockwise on one side and anti-clockwise on the other side of the package, so that the top and middle fingers 92,93 extend longitudinally of the lowermost package and the bottom fingers 94 extend inwardly of the package. The stack of packages fall under gravity onto the four bottom fingers 94. The plate 97 is then allowed to be returned forwardly by the springs 98. The lowermost package falls into the tray 14, and the next package is held between the top and middle fingers 92,93. Each time the mechanism is operated, the lowermost package is dispensed, and the stack of packages advances downwardly by one.

On one side of the storage unit, is a slot 16 in the machine housing and accessible to the user for insertion of the selected package 10, and beneath the slot is a recess 17 for the cup 40 into which the coffee is dispensed. The package is designed for acceptance only if it is inserted with the end containing the water inlet 112 leading and its outlet 38 directed downwards. To achieve this, the sides of the slot are defined by grooves 18 for reception of respective flanges 19 on the particular package of this embodiment. The flange on the right-hand side of the package as it is inserted into the slot (see FIG. 6) has a greater height dimension than the flange on the left-hand side of the package. The leading end of the package also has a nose 20 and along the right-hand side of the package, i.e. built into the thicker flange 19, is a rack defining a row of recesses 21 which act as teeth for engagement by the cranked end 22 of an arm 30 to drive the package to a brewing station within the machine in which a flat on the nose 20 of the package engages an end stop 35.

Figure 7:
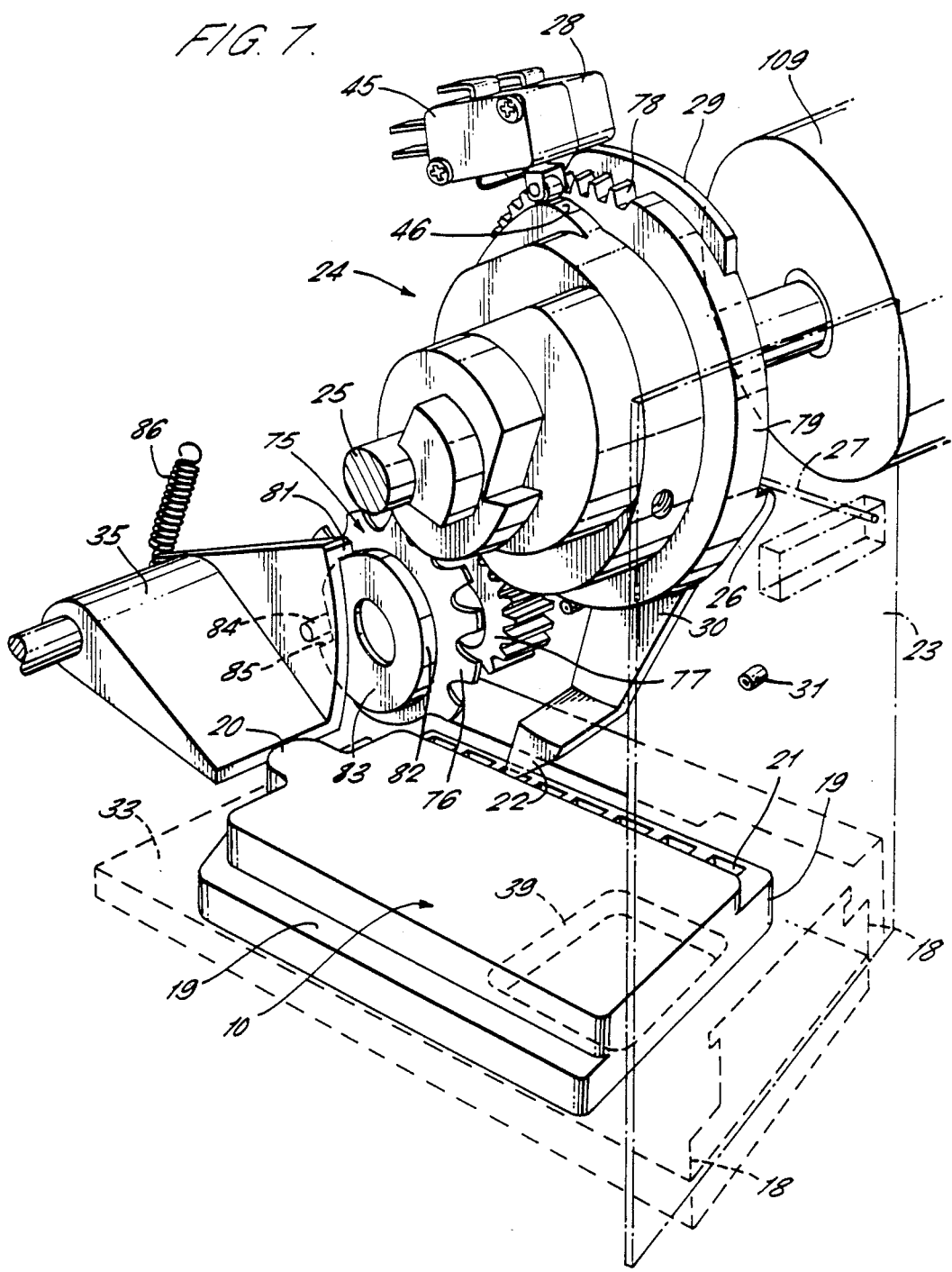
FIG. 7 shows the package inserted into the slot and driven forwards to the brewing station, the slot door then being closed.
Figure 8:
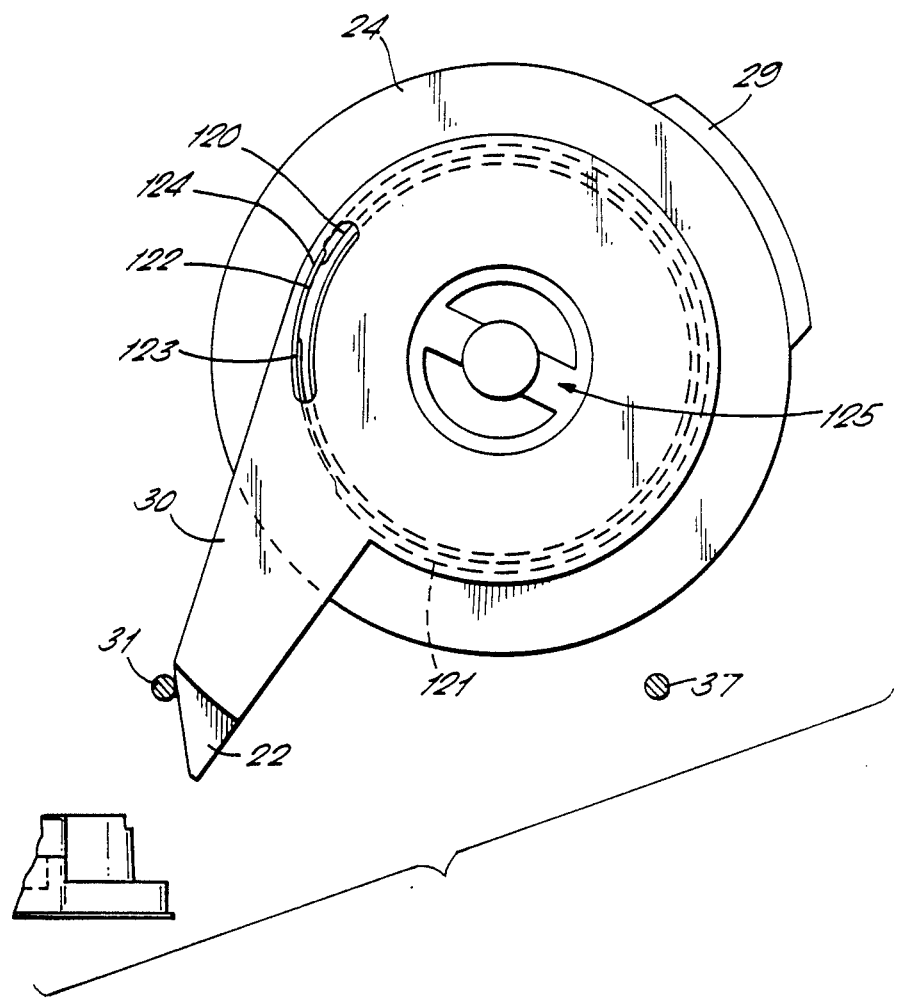
FIG. 8 illustrates the friction coupling between the cam and the arm for moving the package to the brewing station, the cam being in the same position as FIG. 6.

In the static start position, the end stop 35 is in a downwardly pivoted position (FIG. 7) in which a flange 81 on the end stop is held against face 82 of a cam 83 by spring 86, and a pin 84 on the end stop engages a notch 85 in the cam face 82. The end stop 35 is thereby held in its down, operative position. The slot 16 is also closed by a vertically sliding door 23 on the inside of the machine casing. At the brewing station there is a cam 24 mounted on a shaft 25 which is driven via a shaft coupling 125 (FIG. 8) by a reversible electric motor 109 (FIG. 7). Selection of a package by the user starts the motor 109 running in the reverse direction, which rotates the cam 24 backwards, i.e. in an anticlockwise direction as viewed in FIG. 5. A shoulder 26 on the cam engages a pin 27 projecting rearwardly from the door and thereby lifts the door 23 to open the slot 16 for reception of the desired package 10. Reverse rotation of the cam 24 stops when a micro-switch 28 disengages from a surface 29 of the cam and switches off the motor 109. The arm 30 is connected to the cam 24 via a friction coupling. More particularly the arm 30 is mounted on the shaft 25 behind the cam 24 as viewed in FIG. 5 and has an annulus 120 (FIGS. 8 and 9) which fits within a counterbore 121 in the rear surface of the cam. Both facing surfaces of the annulus 120 and the counterbore 121 are undercut to provide a short externally protruding convex face 122 on the annulus 120 in frictional engagement with a longer internally protruding concave face 123 in the counterbore. An arcuate slot 124 is also provided, e.g. by milling, at the junction of the annulus 120 and the body portion of the arm 30, in alignment with the convex face 122. This slot 124 results in the convex face 122 being flexurally supported as a fixed beam by the remaining portion of the annulus 120. During assembly, the convex face 122 of the arm 30 is pre-loaded against the concave face 123 of the cam 24 . such that the frictional force exerted by one face upon the other ensures a driving connection or friction coupling therebetween. Thereby as the cam 24 rotates backwards to open the door 23, the arm 30 is driven by the cam backwards against a back stop 31 (FIGS. 6 and 8). The end 22 of the arm 30 is thereby positioned above the recesses 21 in the package when it is inserted into the machine. The mechanism is now at rest awaiting the insertion of the package.

Figure 9:
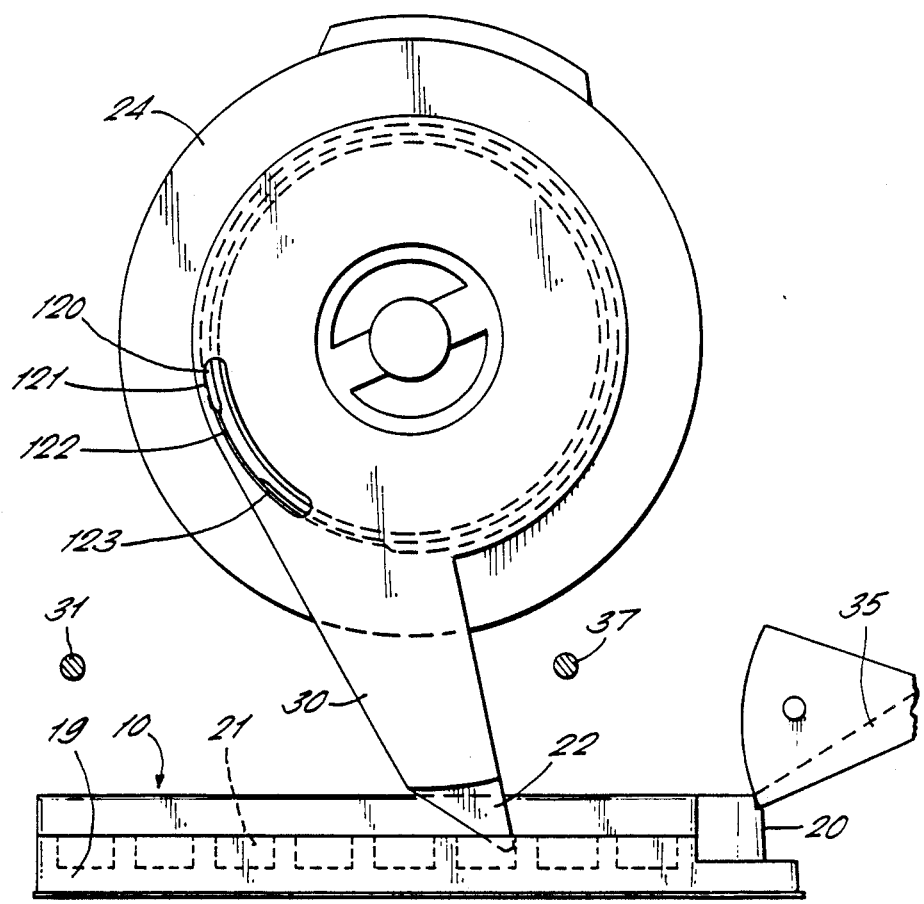
FIG. 9 is a similar view to FIG. 8 with the cam in the same position as FIG. 7.
Figure 10:
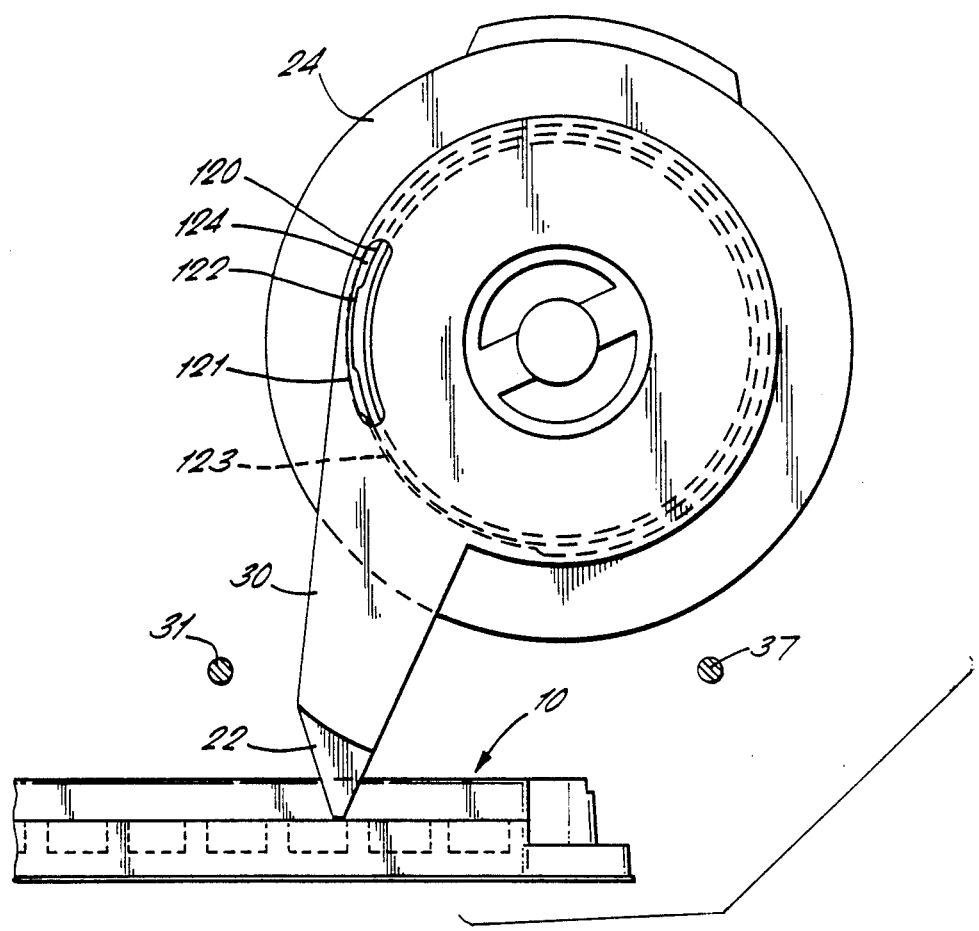
FIG. 10 shows the friction coupling with the arm for moving the package at a position intermediate its positions in FIGS. 8 and 9 and the friction coupling in its slipped condition.
Figure 11:
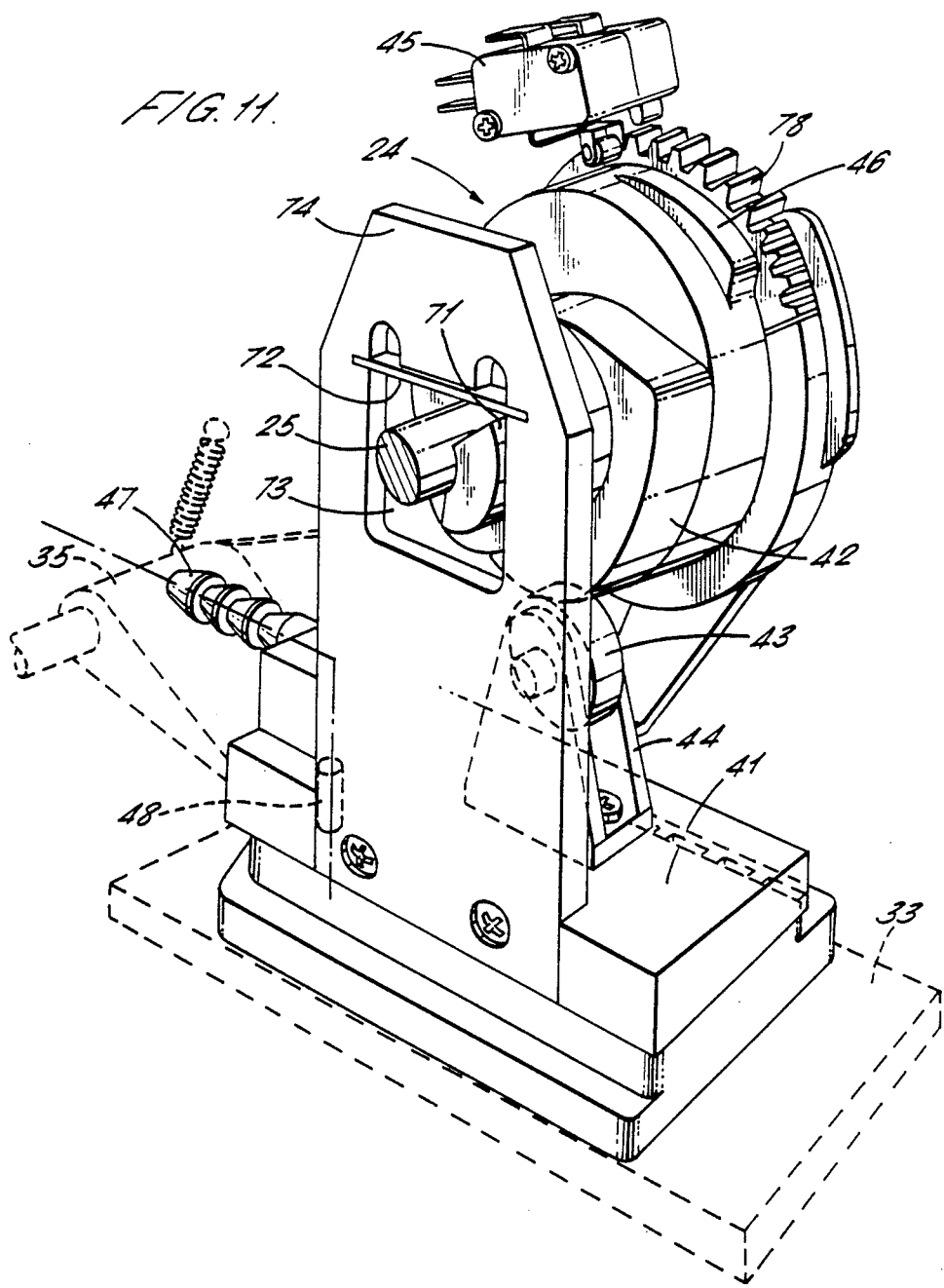
FIG. 11 shows the package clamped between the platens.

On insertion of a package 10, the cam 24 through the friction coupling drives the arm 30 forwardly into its position shown in FIGS. 7 and 9, the end 22 of the arm engaging one of the recesses 21 in the package 10 and moving the package against the end stop 35. However, during the normal subsequent rotation of the cam 24, the friction coupling will allow disengagement of the face 123 of the cam from the face 122 of the arm 30. Also during the step of the end 22 of the arm 30 driving the package 10 towards its end stop 35 to position the package at the brewing station, should the user maintain his grip on the package or even retract the package partially or wholly from the slot 16, the face 122 of the friction coupling will slip relatively to the face 123 (FIG. 10), leaving the arm 30 at an intermediate position and allowing the package to be withdrawn, or at least not moved forwardly by the end of the arm, without risk of injury to the user. The friction coupling thereby enables the drive means to be overridden and the cam 24 can continue to rotate.

The package 10 is inserted by the user with its nose 20 leading and the side flanges 19 engaged in the grooves 18 of the slot. The package also rests on a fixed bottom platen 33 at the brewing station. Only when the package has been inserted far enough to engage a first micro-switch 34 projecting through the wall of the right-hand groove will the operating cycle begin. Engagement of the package with the micro-switch 34 operates the motor 109 to drive the cam 24 forwardly, i.e. in a clockwise direction as viewed in FIG. 6. The arm 30 moves with the cam and the end 22 of the arm engages with one of the recesses 21 of the rack of the package, whereby unless the package is held by the user as described above, subsequent forward movement of the arm drives the package along the bottom platen 33 until the nose of the package engages the end stop 35 (FIGS. 7 and 9). Simultaneously, the forward movement of the cam 24 allows the door 23 to drop under gravity into its closed position behind the package. Also, when the package reaches the end stop 35 it actuates a second micro-switch 36 (FIG. 6) projecting through the wall of the right-hand groove to stop the motor 109 and hence the forward movement of the cam. If the cam is held by the user as described above, or does not otherwise reach the end stop 35, the drive means is overridden and the cam continues to rotate until the package is re-engaged and reaches the end stop 35. The micro-switch 36 is then actuated to stop the motor.

In its position against the end stop 35 (FIG. 7), the package rests on the bottom platen 33 with its outlet 38 above an aperture 39 in the bottom platen for dispensing coffee directly from the package into the cup 40 below. Above the package is a top platen 41 which is movable vertically by the cam 24 between an inoperative raised position and an operative lowered position (FIG. 11) in which the package is firmly clamped between the platens.

Mounted in the top platen 41 in this embodiment, are water introducing means comprising an inlet connector 47 leading to a downwardly directed outlet nozzle 48. The nozzle 48 extends below the bottom face of the top platen 41, so that when the top platen 41 is lowered, the nozzle 48 simultaneously pierces a hole in the aluminium foil sealing layer 119 in alignment with the inlet 112 of the package and enters the inlet.

Downward movement of the top platen 41 is effected by the surface 42 of cam 24 engaging a cam follower 43 mounted on a bracket 44 attached to the top platen.

Rotation of the cam 24, for this stage of the cycle, is actuated by engagement of a micro-switch 45 with cam surface 46.

Clamping of the package by the top platen 41 is necessary because of the subsequent passage of water under pressure through the package during the brewing cycle. Also the fact that the top platen 41 covers the whole of the sealing layer 119, in surface to surface contact, particularly above the slots 115 and interposed castellations 116, acts to reinforce the aluminium foil along the lines of slots 115 and to resist the tendency for the flow of coffee to lift the foil and thereby locally expand the height of the slots which would adversely affect their filtering characteristic.

With the package firmly clamped between the platens 41, 33 further rotation of the cam 24 actuates a needle 49 (FIG. 12) to pierce from below the sealing surface 117 (FIG. 3) closing the lower end of the downwardly directed outlet aperture 38 of the package. For this purpose the needle 49 points upwardly and is carried by a yoke 50 mounted for pivotal movement about the horizontal axis of shaft 51 and for reciprocal vertical movement within the confines of slot 52. The needle 49 has a shoulder 53 between its pointed piercing end 54 and its shank 55. The outlet 38 of the package also has a countersunk portion 120 (FIG. 3) to accommodate the shank 55 of the needle during the piercing operation. The needle is urged towards its uppermost position by a spring 56 attached to the yoke 50, the spring also holding a projection 57 on the yoke in contact with the face 58 of the cam 24. A lever 59 is provided to hold the yoke 50 and hence the needle 49 in its lowermost, inoperative position against the force of the spring 56. For this purpose, the lever 59 adjacent its free end engages a bar 60 on the yoke, and has a cam follower 61 which engages with face 62 of the cam 24. In the cam face 62 is a notch 63.

Figure 12:
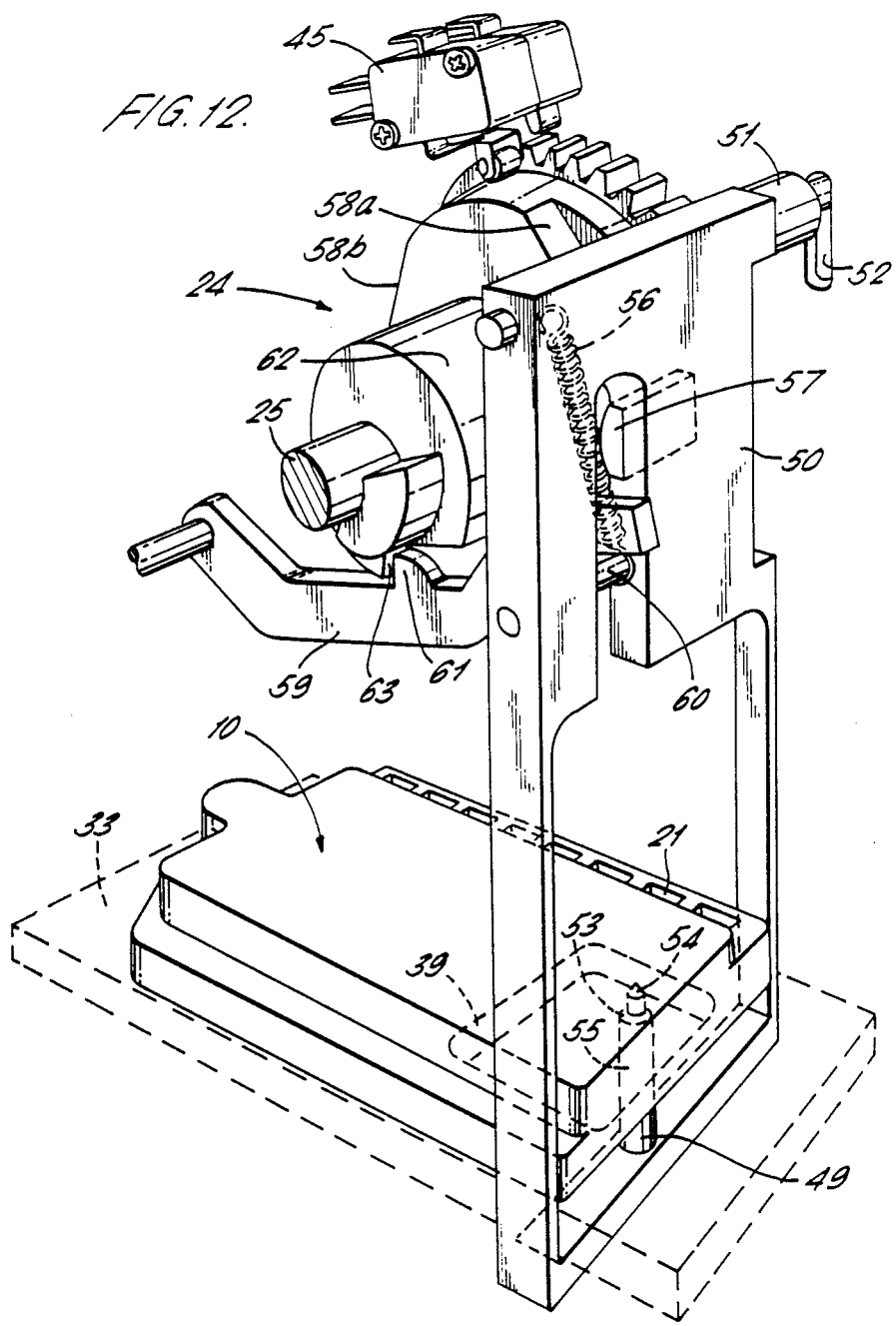
FIG. 12 shows the piercing needle raised to pierce the outlet of the package.
Figure 13:
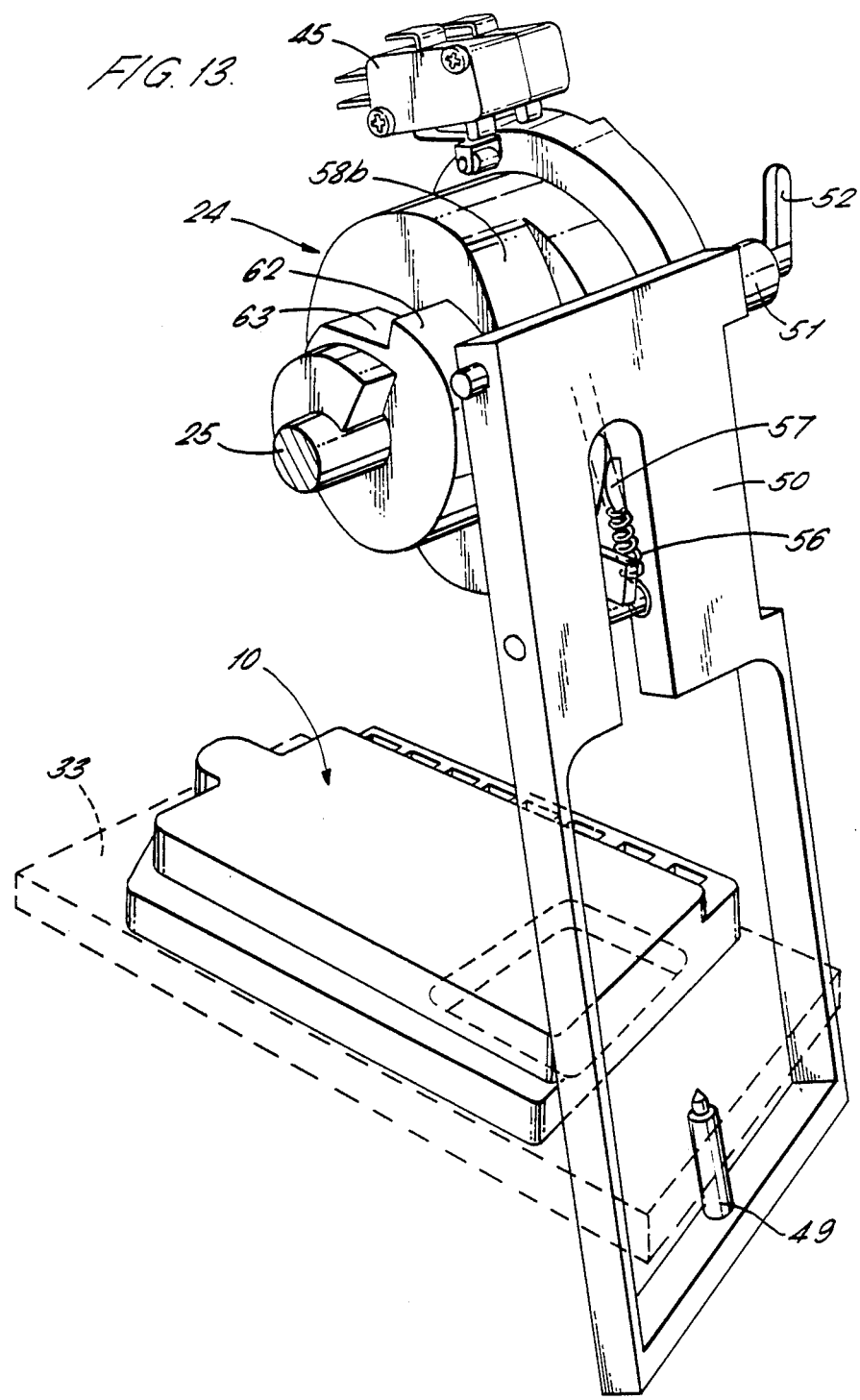
FIG. 13 shows the piercing needle withdrawn and pivoted backwardly.

During normal rotation of the cam 24 in a clockwise direction, the needle 49 is held down and pivoted forwardly, by the combination of the lever 59 and a first flat face 58a of the cam 24, in a position beneath the outlet aperture 38 of the package (FIG. 12). When the cam follower 61 engages the notch 63, the spring 56 raises the yoke 50 and the needle 49 carried thereon so that the needle pierces the sealing surface 117 closing the outlet aperture. The aluminium foil forming the sealing surface 117 is thus punctured and its broken edges are turned inwardly by the shank 55 of the needle to lie neatly within the counterbore 120 of the outlet aperture 38. This feature prevents the foil obstructing the outlet aperture of the package thereby enabling the coffee to flow, at the appropriate stage in the brewing cycle, out of the package without catching on the foil. Should the coffee contact the foil edge, the coffee will not flow in an even stream into the cup below. After piercing the outlet aperture of the package, the needle 49 is withdrawn by further rotation of the cam 24 and tilted to its backwardly pivoted position (FIG. 13) out of the path of the coffee passing from the package into the cup by a second flat face 58b of the cam 24. The mechanism is then set for the timed brewing cycle to occur. Pivotal movement of the needle 49 out of the path of the coffee is important so that the needle is not contacted by the coffee and thus does not become contaminated or require cleaning before piercing the outlet aperture 38 of the subsequent package.

Figure 15:
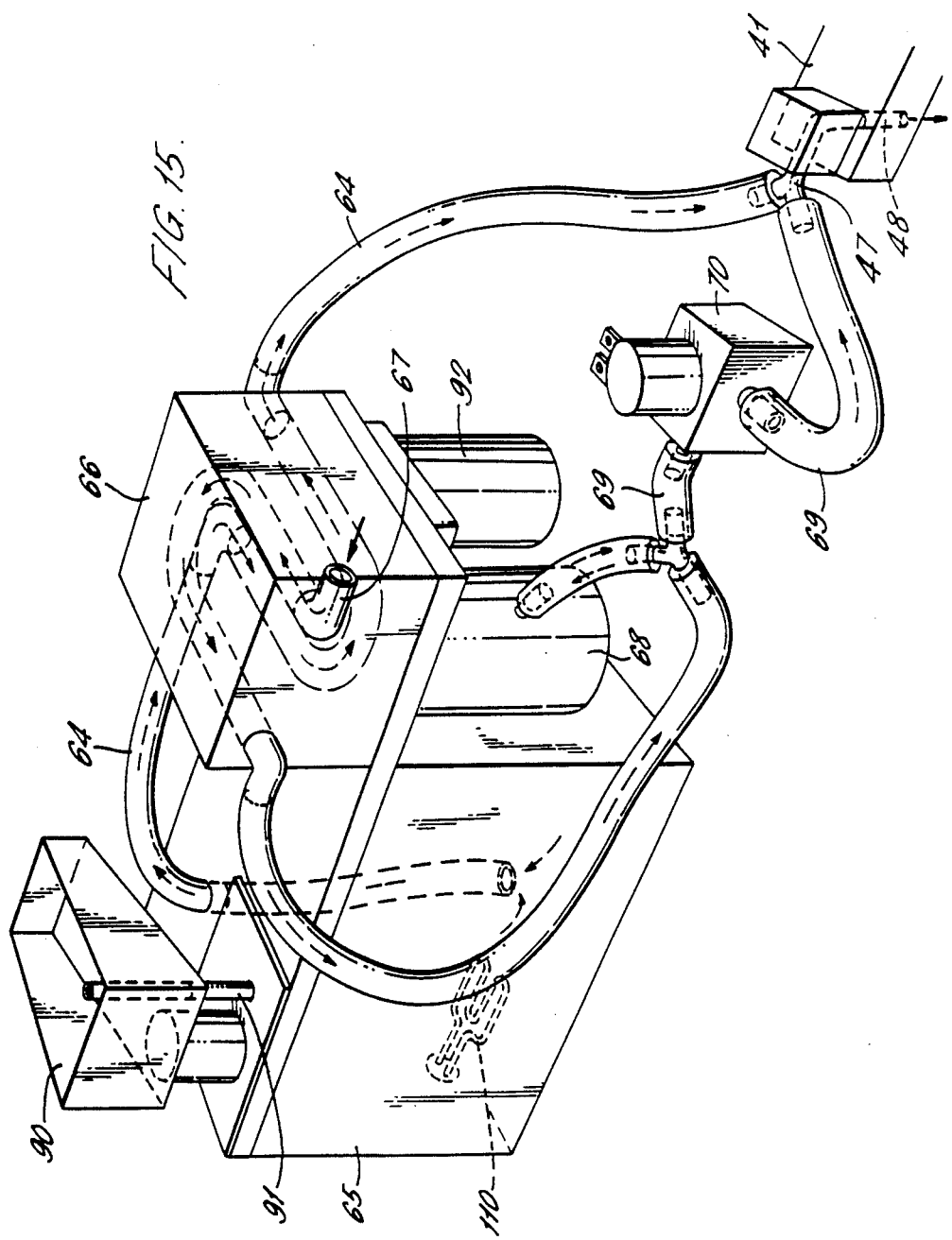
FIG. 15 illustrates the water and air introduction means.
Figure 16:
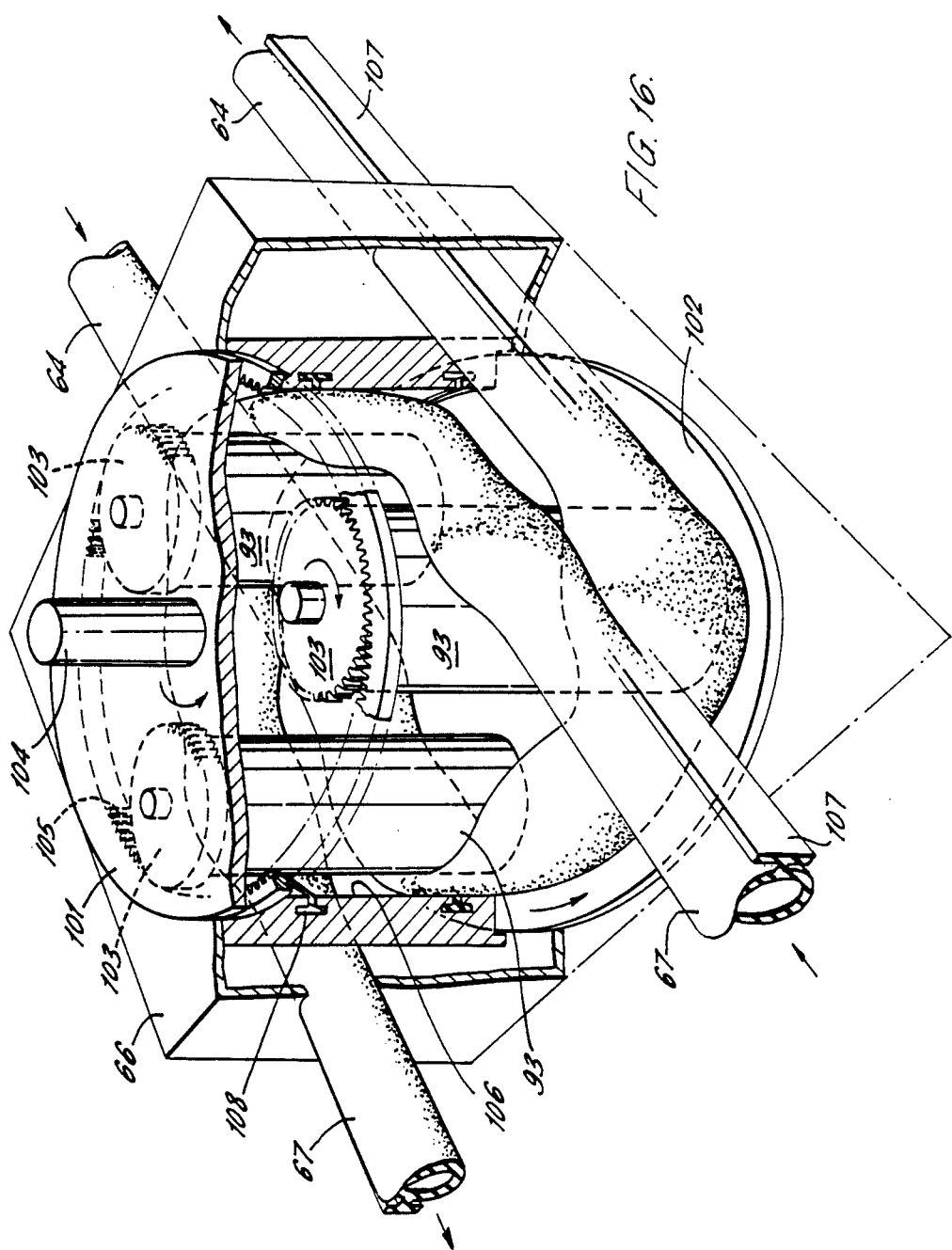
FIG. 16 is a part cut-away, perspective view of the peristaltic pump for pumping water and air simultaneously.

The water inlet connector 47 is connected by a pipe 64 to a tank 65 for supplying, in this embodiment, hot water to the package (FIG. 15). The tank 65 is filled through a tundish 90, a float 91 indicating when the tank is full. Heater means 110 within the tank 65 is thermostatically controlled to maintain the water temperature at about 98° C., i.e. just below boiling. It is also desirable that minimum loss of temperature should occur between the water leaving the tank 65 and its passage through the package. For this reason, the pipe 64 is as short as convenient and a pump 66 provided for feeding the water to the package is mounted as near as possible to the hot tank itself. In this embodiment, the pump 66 is mounted on an extension of the top of the tank 65. The pump 66 is a peristaltic pump operated by a motor 92. In this embodiment, within the pump housing 94 three rollers 93 (FIG. 16) are provided mounted between plates 101, 102 which are carried by a shaft 104 driven by the motor 92 in an anti-clockwise direction as viewed in FIG. 16. Each roller 93 also has a pinion 103 at one end which meshes with a stationary rack 105 attached to the pump housing. By this means, each roller 93 is positively rotated about its own axis as the roller assembly rotates within the pump housing. The pipe 64 passes around the roller assembly, i.e. between the rollers 93 and the internal circumferential surface of the pump housing, in an anti-clockwise direction so that rotation of the roller assembly effects flow of water through the pipe 64. Simultaneously, the rollers 93 of the pump 66 suck air through the open end of a pipe 67 which also passes in an anti-clockwise direction around the roller assembly (as viewed) but starting from the opposite side of the pump, whereby effectively the pipes 64, 67 pass around the rollers of the pump in opposite directions. The other end of the pipe 67 is connected to a reservoir 68 (FIG. 15) thereby creating a quantity of compressed air within the reservoir. At least to reduce the tendency for the roller assembly to drive the pipes 64, 67 forward, each pipe has an integral extruded flange 107 formed during manufacture of the pipe which engages a correspondingly shaped groove 108 in the internal surface 106 of the pump housing thereby securely clamping the respective pipe within the pump housing. Downstream of the pump 66, the pipe 67 has a branch pipe 69 leading to the water introducing nozzle and controlled by a solenoid operated valve 70. The pump 66 thus acts as a double-sided pump feeding water on one side and air on the other, whilst the valve 70 prevents air from passing out of the reservoir 68 until it is required, and also prevents water entering the reservoir.

At the start of the brewing cycle, valve 70 is closed. The pump 66 is operated to feed water from the tank 65 to the nozzle 48, and simultaneously fill the reservoir 68 with compressed air. The water fed to the nozzle will filter through the package, and filtered coffee will emerge through the pierced outlet into the cup below. The pump will then be stopped, and the valve 70 opened. This allows the air from the reservoir to pass immediately as a short burst through the package to achieve two functions. First it will purge the pipe 64 downstream of the pump so that water does not remain static therein. It also flushes the package itself leaving a relatively dry package. Furthermore, using the pump to create a store of compressed air simultaneously to feeding water gives an advantage that the air is able to be passed through the package without a time delay. During the stage of flushing the package, the shut off pump 66 acts as a stop valve to prevent air or water from passing back into the hot water tank 65.

Figure 14:
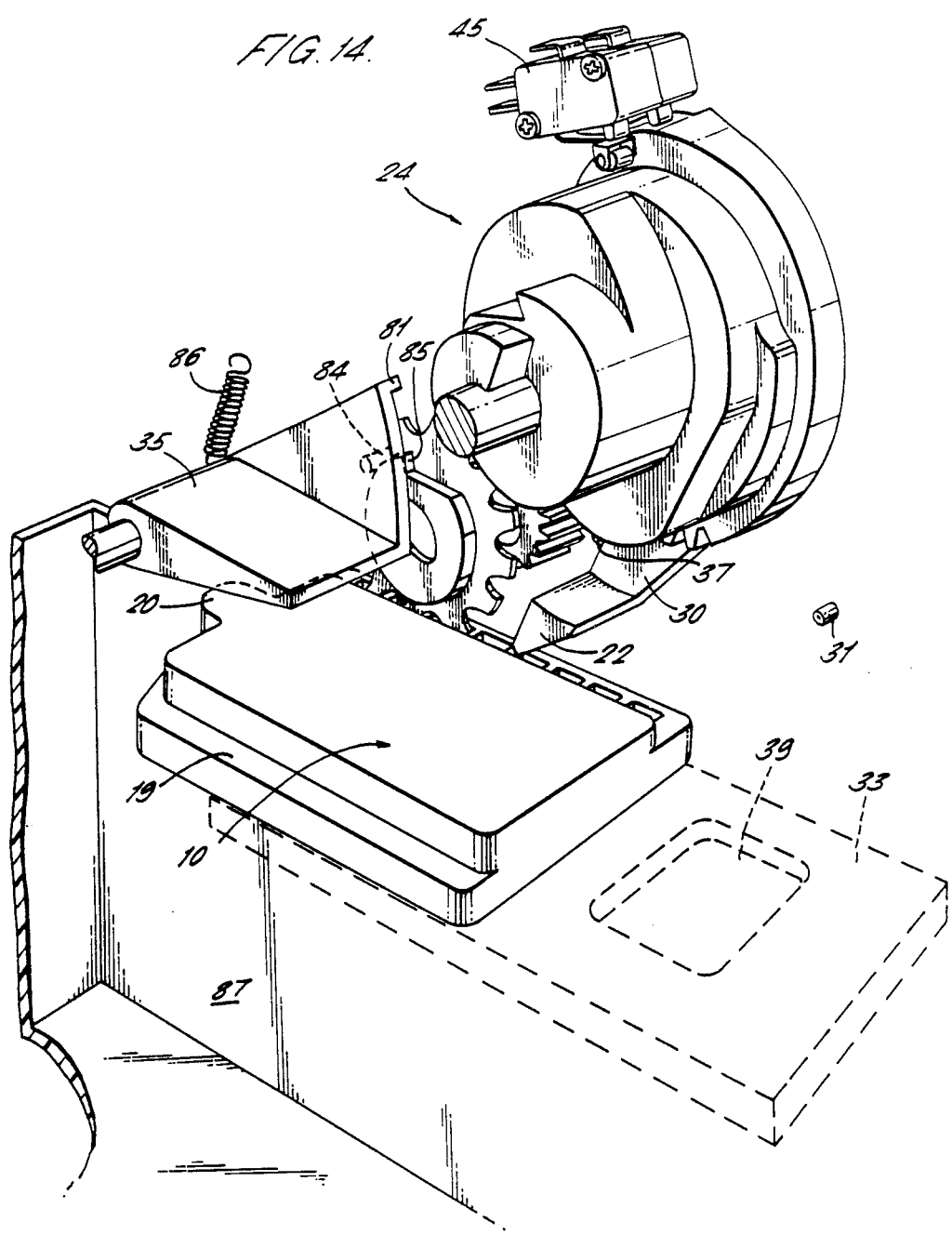
FIG. 14 shows the ejection of the package after the timed brewing cycle.

Following the timed brewing cycle, the used package is removed from the brewing station. To release the package, the upper platen 41 is raised by further rotation of the cam 24, the cam face 71 (FIG. 11) engaging a downwardly facing surface 72 of an aperture 73 in a bracket 74 extending upwardly from the upper platen. Susequently, in this embodiment, the cam 83 is rotated to engage the pin 84 and thereby lift the end stop 35 against the spring 80 until the end stop is above the package (FIG. 14). The cam 83 is formed integrally with a pinion 75 having teeth 76 around a part of its periphery only so that, in the rest position of the cam 83, the teeth 76 do not prevent the package being inserted. The drive connection to the pinion/cam 75,83 is a gear wheel 77 mounted for rotation with the pinion/cam and driven by peripheral teeth 78 comprising a part only of cam face 79, the other part being smooth. Also one tooth of the gear wheel 77 is undercut so that by arranging for this tooth to engage the smooth part of the cam face 79 during the rest period of the pinion/cam 78,83, the drive connection thereto is effectively locked. However, on rotation of the cam 24 so that the teeth 78 of the cam face 79 engage the gear wheel 77, the teeth 78 will rotate the gear wheel and hence the pinion/cam. The end stop 35 is thereby released as described above, and the pinion 75 is rotated so that its teeth 76 engage the recesses or rack 21 of the package to drive it forwardly off the bottom platen 33 into a waste bin 87 (FIG. 14). At the same time the cam 24 is reengaged in driving relation with the arm 30 and drives it forwardly against a front stop 37, in which position the end 22 of the arm is disengaged from the rack 21 of the package. The waste bin is disposed beneath and behind the cup recess 17 and is accessible through a hinged door 100. After one rotation of the pinion/cam, the used package is removed from the brewing station, and the pin 84 is reengaged in the notch 85 of the cam 83 whereby the end stop is returned to its down, operative position to await the next package. Simultaneously, the cam 24 also allows the yoke 50 carrying the piercing needle 49 to return to its rest position in which the needle is positioned vertically beneath the position to be occupied by the outlet aperture of the next package.

Prior to use, the beverage preparing machine is stocked with packages 10 containing the desired beverage ingredient or selection of beverage ingredients, which in this embodiment is roast and ground coffee. The upper platen 41 is raised, the end stop 35 is down, the outlet piercing needle 49 is in its forwardly pivoted position, and the slot door 23 is closed. The tank 64 is filled with water which is maintained hot by the heater 110, and the valve 70 is closed.

A user inserts a coin and selects the desired package 10 by pressing the respective button 12. The package drops into the tray 14. Simultaneously the cam 24 is operated by the motor 35 to rotate backwards to preset the arm 30 against its back stop 31 and to open the slot door 23. The user places a cup in the recess 17, and inserts the package 10 into the slot 16 a sufficient distance to engage the micro-switch 34. The motor 109 driving the cam 24 is thereby operated to start the treatment process. The cam 24 is rotated forwards, and the end 22 of the arm 30 engages the rack 21 of the package 10 to drive the package forwards into a position on the bottom platen 33 in which the nose 20 of the package engages the end stop 35 and the outlet 38 of the package is directly above the piercing needle 49. In this position, the package operates the micro-switch 36 to switch off the cam motor 109, and is located at the brewing station. The cam motor is then operated to lower the upper platen 41 to securely clamp the package and to insert the water introducing nozzle 48 through the top surface 119 of the package, and then to release the piercing needle 49 to open the outlet of the package. Subsequently the needle 49 is withdrawn from the outlet and pivoted backwardly out of the vertical plane of the outlet.

The brewing cycle then follows. The pump 66 is operated to feed hot water from the tank 65 under pressure into the package 10 and simultaneously to fill the reservoir 68 with compressed air. The water passes through the package, and filtered coffee emerges from the outlet and flows smoothly into the cup below. After a metered amount of water has been fed to the package, the pump 66 is stopped and the valve 70 opened. Opening of the valve 70 allows the reservoir 68 to be immediately evacuated, the resultant burst of air passing through the package serving to empty the remaining water from the pipe 65 downstream of the pump 66 and from the package leaving the drained grounds in the package firm and dry. The valve 70 is then closed. Whilst the user removes his cup of coffee, the cam motor 109 is again operated, first to raise the upper platen 41. The end stop 35 is then raised by rotation of the subsidiary cam 83. The used package is engaged by the pinion 75 and ejected from the brewing station into the waste bin 87. The end stop is then allowed to fall back into its operative position, and, simultaneously the piercing needle is returned to its forwardly pivoted position to await a fresh package inserted by the next user. The operating cycle is ready to be repeated.

Figure 17:
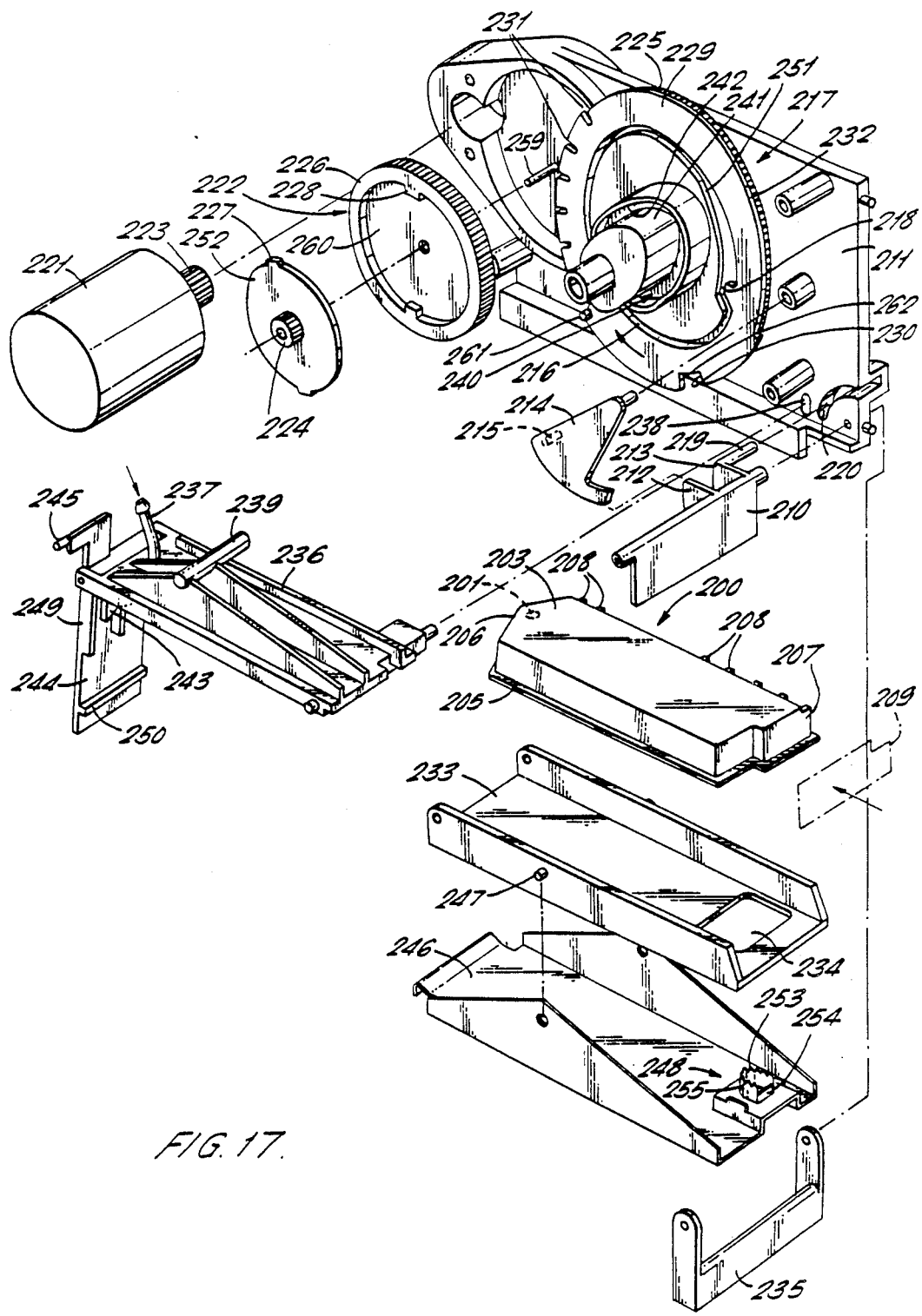
FIG. 17 is an exploded view of a second beverage preparing machine.

FIGS. 17 to 19 concern another coffee dispensing machine which operates in the same general manner as the machine of FIGS. 1 to 16. Thus only the basic differences are illustrated and will be described.

The package 200 still has a water inlet 201 in the upper surface of the package adjacent its leading end, and a coffee outlet aperture 202 in the lower surface of the package adjacent its trailing end, in relation to the direction of travel of the package through the machine. Both the water inlet 201 and the coffee outlet aperture 202 are initially sealed by aluminium foil 203, 204 respectively. In the case of the coffee outlet aperture 202 (see FIGS. 18 and 19), the foil 204 covers the outlet aperture, and is sealed to a surface area 256 surrounding the outlet aperture but not to the rim 257 itself. Between the area 256 and the rim 257 is a trough 258. The package has a relatively thin peripheral flange 205 about its base and a nose-shaped leading end 206. On the right-hand side of the package, as it is inserted into the machine, is a thicker flange 207 formed by outwardly protruding vertical ribs 208 constituting a rack by which the package is driven to the brewing station and subsequently ejected therefrom. The first two ribs are spaced forwardly towards the nose of the package relative to the remainder of the ribs.

The entry slot 209 of the machine is profiled to compliment the thicker flange 207 on the right-hand side of the package and thereby prevent the package being inserted the wrong way round or upside down.

Within the machine, behind the slot 209, is an entry door 210. The door is hinged to parallel side plates 211 (only one of which is shown) for inward movement about its top edge, by the package. After the package has been inserted and driven inwardly to the brewing station, the door returns, by gravity, to its closed position, the quadrant 212 on the internal surface of the door resting against the trailing end of the package. The door is also locked by a triangular shaped member 214 which is pivoted at its apex to the right-hand side plate 211 and which, in its operative position, sits on quadrant 212. Swinging movement of the locking member 214 between its operative and inoperative positions is effected by engagement of a projection 215 on the member in an annular track or channel 216 in the drive cam 217. The cam rotates through one revolution during each brewing cycle. The track 216 includes a portion 218 in which the projection 215 is positioned in the rest or home position of the cam, the member then being in its inoperative position and the door 210 unlocked. Rotation of the cam 217 in a clockwise direction as viewed in FIG. 17 causes the surface 251 to depress the member 214 to lock the door 210, which has by then closed, after insertion of the package into the machine. Attached to a second quadrant 213 on the door is an outwardly extending projection 219 which slides around channel 220 in the right-hand side plate 211 during opening and closing of the door. This projection 219 acts to operate a microswitch when the door is closed, to send a signal to the controller.

The cam 217 is driven by motor 221 via an intermediate gear 222, a pinion 223 on the motor shaft engaging the gear 222, and a pinion 224 on the gear 222 engaging a gear wheel 225 fixed to the cam. The intermediate gear 222 is constructed of two separate parts 226, 252, both of which are mounted for rotation on the same shaft 250. Part 226 of gear 222 carries the outer ring of teeth surrounding a central recess 260, and part 252 comprises a plate which lies within the recess 260 and on which is mounted the pinion 224. A driving coupling is provided between the two parts, the coupling comprising a projection 228 on the part 226 projecting inwardly from the wall of the recess 260, for engaging an outwardly extending projection 227 on the plate of part 252. However, freedom of rotary movement is also possible between the two parts 226, 252 whereby the cam 217 and part 252 can be rotated by the package 200 without rotating part 226 and the motor 221. For this purpose, the leading rib 208 of the package engages the rearwardly facing surface 262 on the cam.

The cam 217 also has secondary teeth disposed around the periphery of the outer section 229 of the door control track 216 for engagement with the ribs 208 of the package 200. These secondary teeth comprise a single tooth 230 for engaging behind the second rib 208 of the package 200 to drive the package to the brewing station, and a series of narrow slots or teeth 231 for subsequently engaging the other ribs 208 extending to the trailing end of the package, to eject the used package. A pin 261 is also provided just beyond the last slot 231 which acts to give the package a final push during the ejection of the package. Intermediate the tooth 230 and the slots 231, the edge 232 of the cam is cut back to allow the cam to ride over said other ribs 208 of the package during the intervening period of the brewing cycle.

When the package 200 is at the brewing station, the package rests flat on the base of a channel shaped lower platen 233 having a cut-out 234 aligned with the outlet aperture 202 which is still sealed. The platen 233 is hinged to the side plates 211 at its inner end, and held horizontal by a catch 235. The catch 235 may be released and the platen 233 pivoted downwardly for servicing of the machine or unjamming the machine, for example, if it becomes blocked by a misfed package or other object. However, during normal operation of the machine, the lower platen 233 remains stationary. The side plates 211 also extend downwardly within the channel shaped lower platen, but provide a gap above the base of the platen. This gap allows the peripheral flange 205 on each longitudinal edge of the package to slide between the lower edge of the respective side plate 211 and the base of the platen.

An upper platen 236 clamps the package 200 on the lower platen 233, the upper platen having a flat underside for making surface-to-surface contact with the top surface of the package, thereby maintaining the width of the filtering slots within the package as described in the first embodiment. Also, as before, the upper platen 236 carries the water introducing nozzle 237 of the machine which also acts to pierce the inlet seal of the package when the platen is pushed downwardly by the cam 217. For this purpose, the upper platen 236 is hinged at its outer end within short slots 238 which allow that end of the upper platen a small amount of vertical movement to achieve the required surface to surface contact with the package. Mounted on top of the upper platen 236 is a transverse bar 239 which engages a circular track or channel 240 in the cam 217. Thereby, on rotation of the cam, the convex surface 241 of the track acts to lower the platen from a rest position to clamp the package. A microswitch actuated by a projection on the back of the cam indicates to the controller when the upper platen is fully down. After the coffee has been dispensed from the package, the concave surface 242 of the track acts to raise the platen into a position which is higher than its rest position.

On the underside of the upper platen 236 adjacent its inner end is an end stop 243 for engagement by the nose 206 of the package 200 to locate the package at the brewing station. When the upper platen is fully raised by the cam, the end stop is clear of the package to allow the used package to be ejected off the lower platen 233 into a waste bin. At the same time, the package opens a flap 244 which is hinged to the inner end of the upper platen for movement about a horizontal axis.

The flap 244 carries an actuator 245 which operates a microswitch when the flap has returned to its vertical position after ejection of the used package into the waste bin. Thereby, if the waste bin is too full to allow the flap to return, the machine is precluded from operating until the waste bin has been cleared.

The flap 244 is also employed to pierce the foil 204 covering the coffee outlet aperture 202 of the package 200 and thereby open the sealed outlet aperture. For this purpose a lever 246 extending longitudinally beneath the lower platen 233 is balanced about a central pivot 247 on the lower platen. Mounted on the end of the lever 246 below the cut-out 234 in the lower platen is a tubular piercing tool 248. When the lever is pressed downwardly at its other end, the tool 248 rises through the cut-out to pierce the package externally of the outlet aperture 202. The piercing tool 248 remains raised whilst the coffee is dispensed but out of path of the coffee. This movement of the lever 246 is effected by the underside of two vertical ribs 249 on the flap 244 as the upper platen 236 is being lowered. Return movement of the tool is effected by a horizontal bar 250 on the flap 244 lifting the adjacent end of the lever 246 as the upper platen 236 is raised after the coffee has been dispensed.

This is different to the first embodiment in which the piercing needle is lowered and removed from the outlet aperture 202 prior to the dispensing of the coffee. For this reason, in this embodiment, the piercing tool 248 comprises an open ended cylinder 255 of D cross-section having dimensions larger than the external dimensions of the outlet 202. The arcuate portion 253 of the upper end of the tool 248 is serrated to pierce and eventually to cut the foil 204, without removing any foil. The straight bar portion 254 at the same end is cut back longitudinally of the cylinder at least to the base of the teeth of the serrated portion to fold or push the cut foil 204 away from the outlet aperture before the coffee is dispensed therethrough. The bar portion 254 of the tool 248 holds the cut portion of the foil within the trough 258 (FIG. 19), and thereby clear of the outlet 202 and, as in the first embodiment, out of the path of the coffee to be dispensed. In this embodiment, the D-shaped tool 248 is arranged so that the bar portion 254 is transverse of the lever 246 and nearer to the adjacent end of the lever than the arcuate portion 253.

In operation of this embodiment, the user selects the package 200 and arranges a cup to collect the coffee to be dispensed. The user then inserts the package into the machine through the entry slot 209. The door 210 hinges open and actuates a microswitch to signal to the controller. The front rib 208 of the package engages surface 262 of the cam and turns the cam 217 in a clockwise direction to take up the freedom of rotary movement allowed by the driving coupling between the parts 226, 252 of the intermediate gear 222, the package turning the cam but not the motor 221. When the trailing end of the package is flush with the entry slot 209, the second rib of the package lies in engagement with the tooth 230 of the cam. The motor 221 is started which causes the package to be drawn into the mechanism by the tooth 230 up to the end stop 243 which locates the package at the brewing station on the lower platen 233. At this point the entry door 210 is able to close with the quadrant 212 lying against the trailing end of the package. Rotation of the cam 217 also operates the door lock 214 which prevents further opening of the door 210 until the beginning of the next cycle.

With the package at the brewing station, the cam 217 disengages from the second rib of the package and due to the cut back edge 232 is able to continue rotating. As the cam rotates it causes the upper platen 236 to move downwards from its rest position to clamp the package 200 between the two platens 233, 236. The surface to surface contact between the upper platen 236 and the package 200 also maintains the width of the filtering slots within the package. At the same time as clamping the package, the water introducing nozzle 237 is pushed through the seal 203 and into the inlet 201 of the package. The downward movement of the upper platen 236 also causes the vertical ribs 249 on the flap 244 to pivot the lever 246 so that the piercing tool 248 opens the coffee outlet aperture 202 by piercing and eventually cutting the foil 204 and folding it back into the trough 258. Thereby both the cut material and the tool 248 are held out of the path of the coffee to be dispensed. On completion of the downward movement of the upper platen 236, the cam 217 stops rotating, and a signal to the controller initiates the water cycle which is unchanged from the first embodiment.

On completion of the brewing cycle, the cam 217 continues its rotation and causes the upper platen 236 to lift to a position higher than its start position. The end stop 243 is thereby raised above the package 200, and the lever 246 pivoted to return the piercing tool 248 beneath the lower platen 233. The drive slots 231 on the cam next engage with the rear set of ribs 208 of the package, and cause the used package to move off the lower platen 233 under the flap 244 and into the waste bin. On the package opening the flap 244, the actuator 245 operates a microswitch to signal to the controller. The pin 261 on the cam gives the package a final push and ensures that the package leaves the lower platen. When the package is clear, the cam stops in its home position. Failure of the flap 244 to close, signals that the waste bin is over full and precludes the machine from accepting a further package to start another brewing cycle.

The invention is not restricted to the specific details of the embodiments described above. For example, although it is envisaged that water is passed through the package to prepare the required beverage, it will be appreciated that there may be employed any desired aqueous medium, for example water/milk with or without sugar, which is compatible with the beverage ingredient in the package.

Also, in other embodiments, the slot 16 through which the package 10 is inserted may be another shaped aperture, e.g. a square aperture, to suit the particular package to be treated.

Furthermore, the means for introducing water or other aqueous medium may be independent of the top platen 41.

What is claimed is:

1. A method of preparing a beverage employing a package having a compartment containing at least one beverage ingredient, comprising locating the package at a brewing station, introducing an aqueous medium into the package, allowing the aqueous medium to commingle with the beverage ingredient in the compartment, collecting the beverage so formed through an outlet formed in the package, sealing said compartment of said package by a covering material which determines one dimension of at least one opening acting to filter the beverage passing out of said compartment to the outlet of the package and clamping said package at said brewing station prior to the introduction of the aqueous medium in a manner which maintains said one dimension during the subsequent formation and collection of the beverage.

2. The method of claim 1, wherein the package is a flat pack which is clamped between top and bottom platens at the brewing station, the surface of the package which, in use, is the uppermost surface being formed by the covering material sealing the compartment of the package, the whole of the covering material being held in surface to surface contact with the top platen whilst the package is clamped between the platens.

3. The method of claim 2 wherein a series of slots for filtering the beverage are defined by castellations to which the covering material for the compartment is spot sealed, the covering material determining the width of each slot.

4. The method of claim 3 wherein the package is engaged at the point of entry and the package is conveyed to the brewing station.

5. The method of claim 4 further comprising the step of forming an outlet opening in the package or opening a sealed outlet in the package, the formed beverage emerging through said outlet.

6. The method of claim 5 wherein hot water is the aqueous medium passed through the package.

7. The method of claim 6 wherein the passage of the aqueous medium is followed by a burst of compressed air through the package.

8. The method of claim 7 wherein the used package is ejected from the brewing station.

* * * * *